United States Patent [19]
Fletcher et al.

[11] 3,984,685
[45] Oct. 5, 1976

[54] WIND MEASUREMENT SYSTEM

[76] Inventors: James C. Fletcher, Administrator of the National Aeronautics and Space Administration, with respect to an invention of William C. Cliff; Robert M. Huffaker; Werner K. Dahm, all of Huntsville, Ala.; James A. L. Thomson, Berkeley, Calif.; Thomas R. Lawrence, Huntsville, Ala.; Michael C. Krause, Huntsville, Ala.; David J. Wilson, Huntsville, Ala.

[22] Filed: Dec. 3, 1975

[21] Appl. No.: 637,268

[52] U.S. Cl. .............................. 250/339; 250/338; 250/347; 356/106 R
[51] Int. Cl.² .................... G01B 9/02; G01N 21/00
[58] Field of Search .......... 250/338, 339, 340, 341, 250/347, 348, 351, 353; 356/106 R

[56] References Cited
UNITED STATES PATENTS

| 3,634,682 | 1/1972 | Gold | 356/106 R X |
| 3,780,293 | 12/1973 | Flint | 250/339 |
| 3,915,572 | 10/1975 | Orloff | 356/106 R |

Primary Examiner—Archie R. Borchelt
Attorney, Agent, or Firm—L. D. Wofford, Jr.; George J. Porter; J. R. Manning

[57] ABSTRACT

A system for remotely measuring vertical and horizontal winds present in discrete volumes of air at selected locations above the ground. A laser beam is optically focused in range by a telescope, and the output beam is conically scanned at an angle $\theta$ about a vertical axis. The backscatter, or reflected light, from the ambient particulates in a volume of air, the focal volume, is detected for shifts in wavelength, and from these, horizontal and vertical wind components are computed.

3 Claims, 1 Drawing Figure

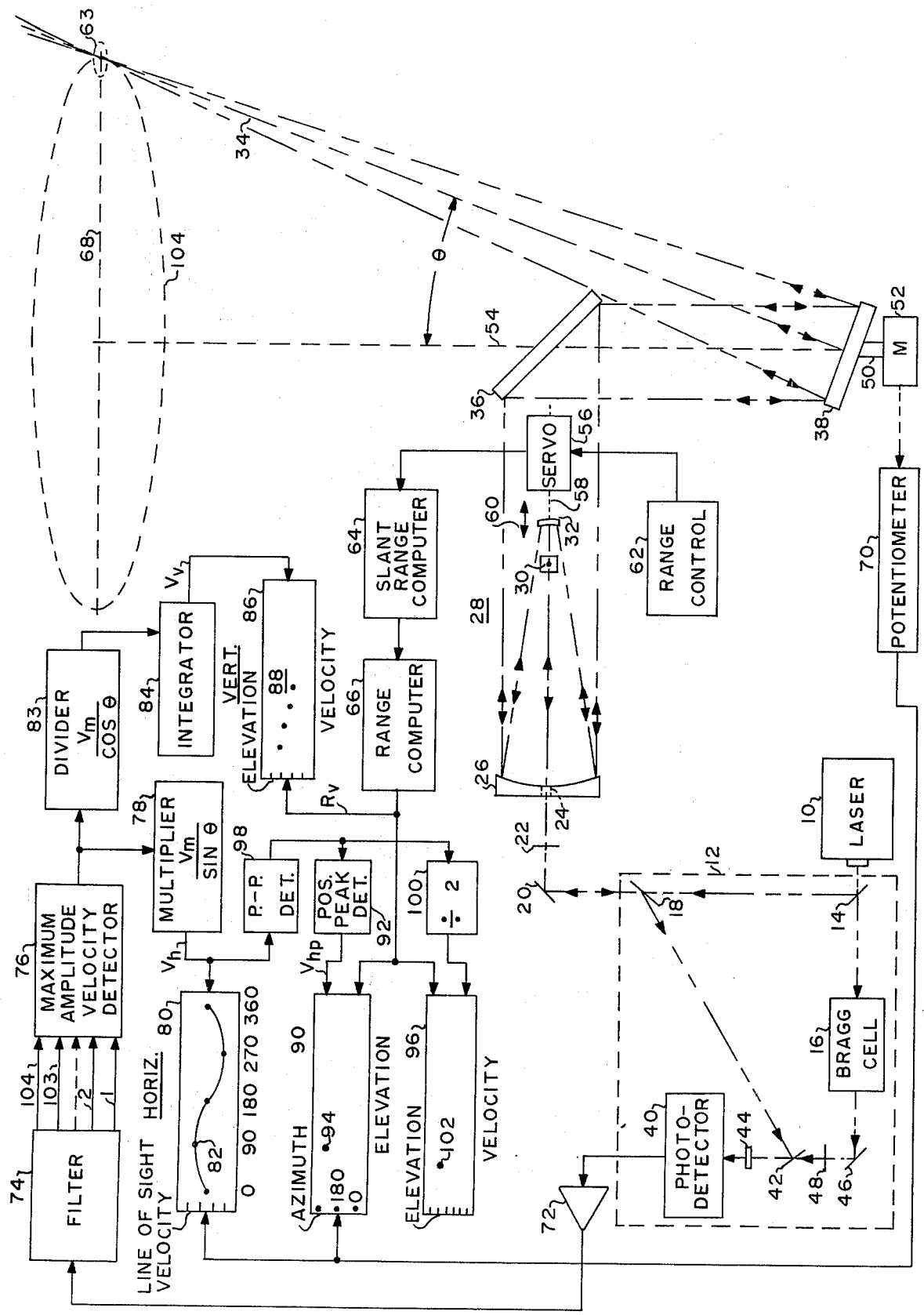

WIND MEASUREMENT SYSTEM

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; U.S.C. 2457).

BACKGROUND OF THE INVENTION

1. Field of the Invention

This invention relates to a system for the measurement of wind velocities, and particularly to such a system wherein winds aloft can be determined remotely in "clear air" conditions to altitudes of several kilometers.

2. General Description of the Prior Art

Several methods have been employed in the past to determine winds at particular altitudes. These methods have generally required or involved one of the following: the deployment of towers extending to the altitude of interest; the tracking of baloons with or without instrument packages; or the flight of kytoons or aircraft. Additionally, efforts are presently being made to develop systems for the acoustic sensing of atmospheric inhomogeneity. The employment of towers to discrete altitudes, particularly the higher ones, is clearly too expensive. In some instances, it would not be safe, particularly where employed in the vicinity of an airport. The sampling of winds at altitudes by using balloons and instrumented aircraft on a continuous basis is also costly. Acoustic measurement techniques have not as yet proven to be satisfactory.

Accordingly, it is an object of this invention to overcome the foregoing and other disadvantages and to provide a system capable of effectively and efficiently measuring the velocity of horizontal and vertical winds present at selected positions aloft extending upward to an altitude of at least one kilometer.

SUMMARY OF THE INVENTION

In accordance with this invention, a form of optical radar is employed utilizing radiation having a wavelength of 3 to 12 microns. The radiation is focused by a telescope to observe discrete focal volumes at selected distances from the telescope from which reflections are received. A scanning mirror is placed in the radiation path and oriented and operated to provide a conical radiation pattern (whole or partial) about a reference line, the reference line typically being vertical. the reflected signals comprise discrete signals shifted in wavelength by velocities of air movement, and these wavelength shifts are detected by a heterodyne detector as doppler shifts. The highest intensity velocity signal $V_m$ is continuously determined by frequency filtering and comparison and is representative of the mean velocity of wind present as appearing in the focal volume along the conical scanning beam. It is divided by the sine of the angle between the reference line and the radiation cone, and this provides a sinusoid which indicates wind velocities in a plane intersecting the cone of scan at the focal plane of the telescope. The mean wind is then equal to one-half of the peak-to-peak value of the sinusoid, and the direction of the wind is illustrated by the position of the positive peak of the sinusoid. Wind velocity along the reference line at its intersection with the focal plane is obtained by dividing the mean wind velocity by the cosine of the angle between the reference line and the radiation cone and then integrating or rectifying it.

BRIEF DESCRIPTION OF THE DRAWING

The drawing is a schematic illustration of an embodiment of this invention.

DETAILED DESCRIPTION OF THE DRAWING

Referring to the drawing, laser 10 is of the $CO_2$ continuous wave type and produces a beam of horizontally polarized (same plane as sheet of drawing) coherent light of a wavelength of 10.6 microns. Its output is directed to interferometer 12 and onto beam splitter 14, a small portion (10%) of the beam passing through beam splitter 14 to frequency translator, Bragg cell, 16 and the principal portion transmitted through Brewster window 18. The latter passes the horizontally polarized beam (it reflects vertically polarized light) to 45° mirror 20. From mirror 20 the beam is projected through quarter wave plate 22, which changes the polarization from horizontal to right-hand circular. It then passes through a central opening 24 in primary mirror 26 of cassegranian telescope 28 and by a vertical wire 30, functioning as a secondary mirror backscatter attenuator to secondary mirror 32. Secondary mirror 32, approximately 12 millimeters in diameter, expands beam 34, projecting it onto primary mirror 26, which is 12 inches in diameter. Primary mirror 26 then reflects the beam onto 45° mirror 36 from which the beam is directed to scanning mirror 38, which then directs it along a desired directional path into space. Vertical wire 30 is approximately one millimeter in diameter and is positioned to interfere with and significantly block direct reflections from secondary mirror 32 to interferometer 12. Otherwise, a problem would exist since secondary mirror 32 is scanned along the axis of the telescope, and the result would be an undesired doppler signal fed to detector 40. Vertical wire 30 does not significantly attenuate reflected signals from space.

The backscatter (reflected portions) of the beam from a focal volume is received back by scanning mirror 38, and the beam path is reversed, being onto 45° mirror 36, primary mirror 26, and then onto secondary mirror 32. From secondary mirror 32 it passes back through quarter wave plate 22, which changes the polarization from left-hand circular (changed from right hand to left hand as a result of reflection) to vertical polarization. From quarter wave plate 22 the beam passes onto 45° mirror 20 and is reflected onto Brewster window 18. Since the beam is vertically polarized, Brewster window 18 reflects the beam onto 45° beam splitter 42 which directs the beam onto focusing lens 44, which focuses the returned beam together with a reference beam to detector 40.

The reference beam is derived from Bragg cell 16 which changes the wavelength of laser 10 by increasing it by 24 MHz to thereby provide a local oscillator beam at a frequency different from that of the transmitted beam so that the sense of direction of the doppler shift from the target may be determined. Thus, there is no duplicate of signals for plus and minus velocities, which there would be otherwise if the local oscillator frequency were of the same frequency as laser 10. As discussed above, Bragg cell 16 is supplied a small portion of the output of laser 10 (about 10%). The output of Bragg cell 16 is turned 90° by 45° mirror 46 and directed through half wave plate 48, which shifts polarization to vertical (normal to plane of sheet of drawing)

polarization. The beam then passes through beam splitter 42 to focusing lens 44, which focuses the beam onto photodetector 40 coincident with its focusing thereon of the return backscatter beam as previously described. Photodetector 40 is typically a HgCdTe photovoltaic cell and produces an electrical signal of a frequency equal to the difference in wavelength or frequency between the two beams.

The output beam from primary mirror 26 of telescope 28 is directed onto 45° mirror 36 which reflects the beam vertically downward to scanning mirror 38, scanning mirror 38 being attached to motor shaft 50 of motor 52 and oriented at an angle to reflect the received beam at an angle $\theta$ from a vertical reference line 54. By rotation of mirror 38, at, for example, a rate of 0.5 Hertz, there is generated a conical radiation beam. The range at which telescope 28 is focused is adjusted or scanned by servo motor 56, which is coupled to secondary mirror 32 and includes means for moving secondary mirror 32 along axis 58 in the directions indicated by arrow 60. Servo 56 is controlled by range control 62 to effect focusing at a selected optical or slant range Rs (Rs = distance from mirror 38 to focal point 63) from telescope 28 to a focal point 63 along beam 34. Slant range detector 64 is coupled to servo 56, senses its control of mirror 32, and provides as an output a signal representative of the range set in by servo 56. Range counter 66 multiplies this output by the cosine of angle $\theta$ to obtain a distance along reference line 54, the axis of rotation of mirror 38, from telescope 28 to the intersection with focal plane 68. Thus, where the axis or reference line 54 is a vertical line, focal plane 68 is located at a selected height aloft which is to be scanned for wind velocity.

Potentiometer 70, mechanically coupled to motor 52, provides a signal representative of the angular position of motor 52 and mirror 38, for example, for providing an increasing voltage from 0, representative of 0° of azimuth, to a maximum value at 359°.

The output of photodetector 40 is amplified in amplifier 72 and fed to frequency filter 74 which provides, as discrete outputs, frequencies present, these discrete outputs being represented by a plurality of frequency lines 1–104 wherein the lowest frequency is 100 KHz and the highest frequency is 10.5 MHz, with a frequency separation of 100 MHz, or 1.8 feet per second. These outputs are fed to peak velocity detector 76 which selects the velocity output of maximum intensity, as representative of the mean velocity present. Alternately, the mean velocity may be computed by averaging the intensity-velocity distribution. As an example, peak amplitude velocity detector 76 would encompass a comparator which compares in ascending velocity order the intensity of two successive velocity channels, storing the designation of the channel of higher amplitude. This would continue until a complete comparison is made of channels 1–104. The highest intensity velocity channel identified is encoded with a signal $V_m$ proportional to its velocity designation. In order to resolve this signal into a horizontal velocity, $V_m$ is multiplied in multiplier 78 by $1/\sine \theta$, and this provides a horizontal output $V_h$ which is applied to horizontal wind indicator 80. An output of potentiometer 70, indicative of the instantaneous azimuth position of beam 34, is also applied to line-of-sight wind indicator 80. As shown, this indicator is in the form of an oscilloscope wherein the velocity signal is an X input signal. There will result a sinusoid as mirror 38 turns 360° which will be angularly displaced, depending upon the wind direction. As shown, the wind direction would be angularly read off at its maximum measured velocity point 82 located at about 90°, for example. The horizontal wind velocity is equal to one-half of the magnitude of the peak-to-peak value.

Vertical wind is also obtained from an output of detector 40, and to accomplish this, $V_m$ is divided by the cosine of angle $\theta$ in divider 83 to provide a purely vertical component $V_v$ of this velocity, and then this component is integrated in integrator 84. The result is a DC level which is applied to vertical wind indicator 86, as illustrated. Vertical wind indicator 86 is an oscilloscope wherein the vertical velocity component signal $V_v$ is applied to the X input, and vertical range (elevation) signal $R_v$ obtained from range computer 66 is applied to the Y input. Vertical velocity is indicated by the horizontal position in indicator 86 versus range (elevation) by the vertical position of the dot trace 88.

Oscilloscope display 90 plots horizontal wind direction versus elevation. This is accomplished by providing a range input $R_v$ from range computer 66 as a Y input and azimuth signal from potentiometer 70 as an X input signal and a horizontal peak wind signal $V_{hp}$ from positive peak detector 92 as a Z input signal. Positive peak detector 92 provides a pulse at time 82 (showing on line-of-sight wind detector 80) which turns on the beam of an oscilloscope display 90, this occurring at a point on the horizontal sweep corresponding to the point in azimuth scan wherein maximum line-of-sight velocity is sensed. Thus, dot 94 will be indicative of the horizontal direction of wind at a selected elevation.

Oscilloscope display 90 plots horizontal wind intensity versus elevation with a horizontal wind intensity signal being applied to the X input and elevation signal being applied to the Y input. Horizontal velocity is equal to the peak-to-peak value of the sinusoid shown on line-of-sight wind display 80 divided by two. Thus, an output from multiplier 78 is applied to peak-to-peak detector 98, and the output of peak-to-peak detector 98 is applied by divide by two divider 100, and the output of the latter is applied as the X input to oscilloscope display 96. Thus, oscilloscope display 96 displays as a dot 102 an indication of horizontal wind velocity as plotted versus elevation.

In operation, telescope 28 is focused at the altitude of interest 68, e.g., up to approximately one kilometer, this being accomplished by range control 62 through servo 56 which positions secondary mirror 32. Motor 52 is then operated on and beam 34 is scanned in azimuth tracing out a circle at the selected amplitude, illustrated by circle 104. The backscatter from focal volumes 63 scanned is received back by scanning mirror 38 and passes back through the system to photodetector 40 and velocity signals determined in the manner described. In test, the precision of the instantaneous velocity components measured was better than .5 feet per second when compared with conventional meteorological instrumentation. By means of this invention, it is possible to rapidly scan at a number of elevations, either discretely or continuously, and to rapidly provide a profile of horizontal and vertical wind velocities aloft. By providing the horizontal and vertical wind profiles, significant wind shears are quickly detected, making the system particularly of value for use in examining winds in the vicinity of airports. While the system has been illustrated as operating vertically, it may be operated at other angles; and by appropriate computing means, desired wind components determined for regions aloft which may thus be at different elevations and at different geographical locations.

What is claimed is:

1. A wind measurement system for remotely measuring the velocity of a region of air in space, a focal volume, comprising:
   a source of radiation of a wavelength of 3 to 12 microns;
   a telescope including a viewed port, a viewing port, training means for directing the field of view of said viewing port onto a discrete focal volume in space, and range adjustment means for varying the focus of said telescope;
   photodetection means responsive to radiation of different wavelengths for providing an electrical output of a frequency representative of the difference of said wavelengths;
   interferometer means comprising:
      first coupling means for coupling a major portion of the output of said source of radiation to said viewed port of said telescope,
      second coupling means for coupling radiation reflected from a said focal volume to said viewing port and through said telescope to said detection means, and
      means responsive to a minor portion of the radiation from said source of radiation for providing a reference wavelength to said photodetection means;
   scanning means for directing the line of view of said telescope in a conical pattern at a selected reference angle $\theta$ with respect to a central reference line, scanning being at a selected rate;
   scan position means for providing a position output representative of the angular position $\alpha$ of rotation of said beam as it rotates about said reference line and with respect to a reference position;
   filter means responsive to said photodetection means for providing as discrete frequency outputs the frequencies comprising the output of said photodetection means;
   peak velocity detection means responsive to the output of said filter means for providing as an output a signal proportional to the highest frequency present;
   normal velocity resolving means for multiplying the output of said peak velocity detection means by the sine of said angle $\theta$ for providing as an output a signal proportional to winds present in an observation plane perpendicular to said reference line which intercepts focal volumes upon which said telescope is focused by said range adjustment means during a cycle of conical scan; and
   indication means responsive to the angular position output $\alpha$ of said scan position means and the output of said normal component resolving means for indicating the direction and velocity of wind in said observation plane.

2. A wind measurement system as set forth in claim 1 further comprising:
   range means responsive to said range adjustment means for providing an output indicating the distance at which said telescope is focused;
   axial range resolving means for multiplying the output of said range means by the cosine of angle $\theta$ for providing as a range output the distance between said telescope along said reference line to said observation plane;
   axial velocity resolving means for multiplying the output of said peak velocity detection means by the cosine of said angle $\theta$ and for providing an output thereof;
   integration means for integrating the output of said axial velocity resolving means and providing as an output a peak wind velocity along said reference line; and
   second indication means responsive to the output of said integration means and said axial range resolving means for indicating wind velocity along said reference line in terms of distance along said reference line from said telescope.

3. A wind measurement system as set forth in claim 2 wherein said reference line of said scanning means is a vertical line, and said indication means provides an indication of horizontal wind, and said second indication means provides an indication of vertical wind.

* * * * *